US012499115B1

United States Patent
Niu et al.

(10) Patent No.: US 12,499,115 B1
(45) Date of Patent: Dec. 16, 2025

(54) SYSTEMS AND METHODS FOR A REASONING-INTENSIVE RERANKING BASED ARTIFICIAL INTELLIGENCE CONVERSATION AGENT

(71) Applicant: Salesforce, Inc., San Francisco, CA (US)

(72) Inventors: Tong Niu, Palo Alto, CA (US); Shafiq Rayhan Joty, San Jose, CA (US); Ye Liu, Fremont, CA (US); Caiming Xiong, Menlo Park, CA (US); Yingbo Zhou, Palo Alto, CA (US); Semih Yavuz, Redwood City, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 19/043,055

(22) Filed: Jan. 31, 2025

Related U.S. Application Data

(60) Provisional application No. 63/700,322, filed on Sep. 27, 2024.

(51) Int. Cl.
*G06F 16/2457* (2019.01)
*G06F 16/248* (2019.01)
*G06N 20/00* (2019.01)

(52) U.S. Cl.
CPC ...... *G06F 16/24578* (2019.01); *G06F 16/248* (2019.01); *G06N 20/00* (2019.01)

(58) Field of Classification Search
CPC .. G06F 16/24578; G06F 16/248; G06F 16/90; G06N 20/00
See application file for complete search history.

(56) References Cited

U.S. PATENT DOCUMENTS

| | | | |
|---|---|---|---|
| 11,568,284 B2 * | 1/2023 | Broyles | G06N 5/04 |
| 2011/0066611 A1 * | 3/2011 | Groeneveld | G06F 16/9535 707/723 |
| 2020/0380038 A1 * | 12/2020 | Rosset | G06F 16/335 |
| 2021/0319907 A1 * | 10/2021 | Harley | G16H 50/70 |
| 2021/0365500 A1 * | 11/2021 | Gunaselara | G06F 40/284 |
| 2021/0374141 A1 * | 12/2021 | Zhao | G06F 16/24578 |

(Continued)

OTHER PUBLICATIONS

Stamatis, "End to End Neural Retrieval for Patent Prior Art Search", 2022, Springer, CLEF, pp. 537-544 (Year: 2022).*

(Continued)

*Primary Examiner* — Jorge A Casanova
(74) *Attorney, Agent, or Firm* — Haynes and Boone, LLP

(57) ABSTRACT

Embodiments described herein provide a method for building an artificial intelligence (AI) agent to respond to a user query. The method includes: receiving a user query; retrieving a set of documents that are ranked based on respective relevance scores of a first type to the user query; generating a core question that filters out irrelevant texts from the user query; generating a first summary of a first document from the set of documents and a first reasoning output explaining how the first summary addresses the core question; generating a relevance score of a second type and a corresponding reranking for the first document based at least in part on a combination of the core question and the first reasoning output; generating a response to the user query using one or more top-ranked documents according to generated rerankings of the set of documents.

20 Claims, 14 Drawing Sheets

(56) References Cited

U.S. PATENT DOCUMENTS

2022/0318255 A1* 10/2022 Fei .................... G06F 16/24578
2024/0193196 A1*  6/2024 Zhu .................... G06F 16/3346
2024/0281472 A1*  8/2024 LaRhette ............ G06F 16/9558
2025/0147991 A1*  5/2025 Zang .................. G06F 16/3329
2025/0278415 A1*  9/2025 Mui .................... G06F 16/3322

OTHER PUBLICATIONS

Sotudeh et al., "Qontsum: On Contrasting Salient Content for Query-focused Summarization", Jul. 14, 2023, arXiv, pp. 1-11 (Year: 2023).*

Xu et al., "LMGQS: A Large-scale Dataset for Query-focused Summarization", May 22, 2023, ACM Anthology, pp. 1-10 (Year: 2012).*

Gao et al., "Query-Guided Self-Supervised Summarization of Nursing Notes", Dec. 2, 2024, pp. 1-19 (Year: 2024).*

* cited by examiner

Query Analysis Prompt          302

You will be presented with a/an {query name}.
Your task consists of the following step:
1. Analyze the {query name}:
 - Carefully read each sentence of the {query name}.
 - Identify the core problem or question being asked.
Here is the {query name}:
{query}

Document Analysis Prompt          304

You will be presented with a/an {query name}, an analysis of the query, and a/an {doc name}.
Your task consists of the following steps:
1. Analyze the {doc name}:
-Thoroughly examine each sentence of the {doc name}.
-List all sentences from the {doc name} that {definition of relevance} the {query name}.
Briefly explain how each sentence listed {definition of relevance} the {query name}.
2. Assess overall relevance:
-If the {doc name}, particularly the relevant sentences (if applicable), {definition of relevance} the {query name}, briefly explain why.
-Otherwise, briefly explain why not.
Here is the {query name}:
{query}
Here is the analysis of the {query name}:
{query analysis}
Here is the {doc name}:
{doc}

FIG. 3A

Judgment Prompt 306

You will be presented with a/an {query name}, an analysis of the {query name}, a/an {doc name}, and an analysis of the {doc name}.

Your task is to assess if the {doc name} {definition of relevance} the {query name} in one word:
- Yes: If the {doc name} {definition of relevance} the {query name}.
- No: Otherwise Important: Respond using only one of the following two words without quotation marks: Yes or No.

Here is the {query name}:
{query}

Here is the analysis of the {query name}:
{query analysis}

Here is the {doc name}:
{doc}

Here is the analysis of the {doc name}:
{doc analysis}

FIG. 3B

|  | BM25 | RankLlama | RankZephyr | JudgeRank | | | Ensemble |
|---|---|---|---|---|---|---|---|
|  |  |  |  | 8B | 70B | 405B |  |
| Biology | 53.63 | 11.05 | 44.37 | 54.44 | 57.59 | 60.33 | 60.70 |
| Earth Science | 53.65 | 11.83 | 35.24 | 54.62 | 58.36 | 55.11 | 58.72 |
| Economics | 24.28 | 9.56 | 24.44 | 28.04 | 33.01 | 32.15 | 35.39 |
| Psychology | 38.59 | 11.38 | 36.92 | 42.16 | 46.59 | 45.42 | 47.57 |
| Robotics | 18.77 | 8.53 | 18.80 | 24.09 | 28.30 | 27.64 | 28.16 |
| Stack Overflow | 22.74 | 11.40 | 19.62 | 27.18 | 27.47 | 28.30 | 29.74 |
| Sustainable Living | 25.90 | 11.75 | 29.38 | 30.69 | 39.55 | 38.54 | 41.88 |
| Leetcode | 19.27 | 20.32 | 24.58 | 17.49 | 20.06 | 22.47 | 20.23 |
| Pony | 17.73 | 18.88 | 48.96 | 22.85 | 30.82 | 31.54 | 32.74 |
| Aops | 3.92 | 3.55 | 6.98 | 6.15 | 8.24 | 7.74 | 8.57 |
| TheoremQA-Questions | 18.90 | 11.82 | 22.34 | 24.09 | 23.83 | 26.93 | 25.86 |
| TheoremQA-Theorems | 20.22 | 5.63 | 7.78 | 29.89 | 34.55 | 36.16 | 36.20 |
| Average | 26.47 | 11.31 | 27.25 | 30.14 | 34.03 | 34.36 | 35.48 |

FIG. 7A

| | BM25 | JudgeRank | RankLlama | RankZephyr |
|---|---|---|---|---|
| webis-touche2020 | 34.71 | 27.94 | 32.97 | 33.34 |
| trec-covid | 68.80 | 83.70 | 81.08 | 85.77 |
| scifact | 69.06 | 73.24 | 75.57 | 74.68 |
| nfcorpus | 34.28 | 37.73 | 35.92 | 38.79 |
| dbpedia-entity | 32.02 | 44.30 | 43.72 | 44.19 |
| fiqa | 25.36 | 40.35 | 42.70 | 40.40 |
| scidocs | 16.47 | 19.47 | 19.26 | 19.70 |
| arguana | 47.16 | 62.77 | 32.08 | 47.07 |
| nq | 32.61 | 56.87 | 59.19 | 60.10 |
| climate-fever | 18.61 | 19.00 | 17.75 | 24.26 |
| fever | 64.94 | 69.97 | 78.55 | 79.52 |
| msmarco | 22.75 | 34.01 | 41.40 | 37.89 |
| hotpotqa | 60.22 | 68.30 | 70.65 | 71.16 |
| quora | 80.77 | 84.25 | 82.73 | 79.60 |
| cqadupstack | 32.53 | 43.98 | 42.43 | 42.68 |
| Average | 42.69 | 51.06 | 50.40 | 51.94 |

FIG. 7B

Example rejected by reranker:
(Original rank: 2 out of 100)

Query

Claim in article about why insects are attracted to *light*

In this article they are addressing the reason *insects are attracted to light* when they say heat radiation as an attractive component is refuted by the effect of LED lighting, which supplies negligible *infrared* radiation yet still entraps vast numbers of insects.

I don't see why attraction to LEDs shows they're not seeking heat. Could they for example be evolutionarily programmed to associate light with heat? So that even though they don't encounter heat near/on the LEDs they still "expect" to?

Document

The Goodden GEMLIGHT SUPER is a leap forward in technology greatly advanced on its predecessor the Goodden GemLight. The new *light* is more powerful, and has three different emitters, Blue, Green and *Ultraviolet*, all the most *attractive to insects*. The combination is a greater attractant than UV alone. No batteries to charge and replace: simply plug into a power bank.

Example accepted by reranker:
(Original rank: 86 out of 100)

Query

Why is funnel web spider venom so lethal to humans and not so much for other mammals? According to the information from this article, people and other primates are exquisitely sensitive to funnel web venom but, intriguingly, other mammals such as mice, rabbits, guineapigs, dogs and cats are relatively immune and often survive 100 times the human lethal dosage. Why is the funnel web spider venom so much more lethal for humans and primates than other mammals?

Document

Delta atracotoxin (_-ACTX-Ar1, robustoxin, or robustotoxin) is a low-molecular weight neurotoxic polypeptide found in the venom of the Sydney funnel-web spider (Atrax robustus). Delta atracotoxin produces potentially fatal neurotoxic symptoms in primates, by slowing the inactivation of sodium ion channels in autonomic and motor neurons. In the spiders' intended insect prey, the toxin exerts this same activity upon potassium and calcium ion channels. The structure of atracotoxin comprises a core beta region with a cystine knot motif, a feature seen in other neurotoxic polypeptides.

Extracted Relevant Sentences

Delta atracotoxin produces potentially fatal neurotoxic symptoms in primates, by slowing the inactivation of sodium ion channels in autonomic and motor neurons. In the spiders' intended insect prey, the toxin exerts this same activity upon potassium and calcium ion channels.

SYSTEMS AND METHODS FOR A REASONING-INTENSIVE RERANKING BASED ARTIFICIAL INTELLIGENCE CONVERSATION AGENT

CROSS REFERENCE(S)

The instant application is a nonprovisional of and claim priority under 35 U.S.C. 119 to U.S. provisional application No. 63/700,322, filed Sep. 27, 2024, which is hereby expressly incorporated by reference herein in its entirety.

TECHNICAL FIELD

The embodiments relate generally to machine learning systems for text generation, and more specifically to systems and methods for a reasoning-intensive reranking based artificial intelligence conversation agent.

BACKGROUND

AI agents, commonly known as AI agents or virtual assistants, can be applied to a wide range of practical applications across various industries. In customer service, AI agents can handle user inquiries, provide support, and resolve issues 24/7, improving customer satisfaction and reducing operational costs. In healthcare, AI agents can offer initial consultations, answer health-related questions, and remind patients to take their medications. In the e-commerce sector, AI agents can assist with product recommendations, order tracking, and personalized shopping experiences. In information technology (IT) support, these agents can guide users through troubleshooting steps, helping them resolve software and hardware issues. Specifically, for network hazards, AI agents can diagnose connectivity problems, suggest corrective actions, and provide step-by-step guidance to ensure network security and stability. Their versatility and ability to handle diverse tasks make them valuable tools in enhancing efficiency and user experience in various fields.

AI agents often employ a neural network based generative language model to generate an output such as in the form of a text response, or a series actions to complete a complex task, such as to network issue troubleshooting, etc. Such generative language model receives a natural language input in the form of a sequence of tokens, and in turn generates a predicted distribution over a token space conditioned on the input sequence. Generated output tokens over time may in turn form the text response, or actions for completing the task. However, it can be challenging for existing retrieval-augmented generation (RAG) LLM to generate responses for reasoning-intensive tasks because the RAG LLM lacks the cognitive processes.

BRIEF DESCRIPTION OF THE DRAWINGS

FIGS. 3A and 3B show examples of instructions used for AI agent framework 100, according to some embodiments.

FIGS. 7A-7E provide charts illustrating exemplary performance of different embodiments described herein.

Figure 1:
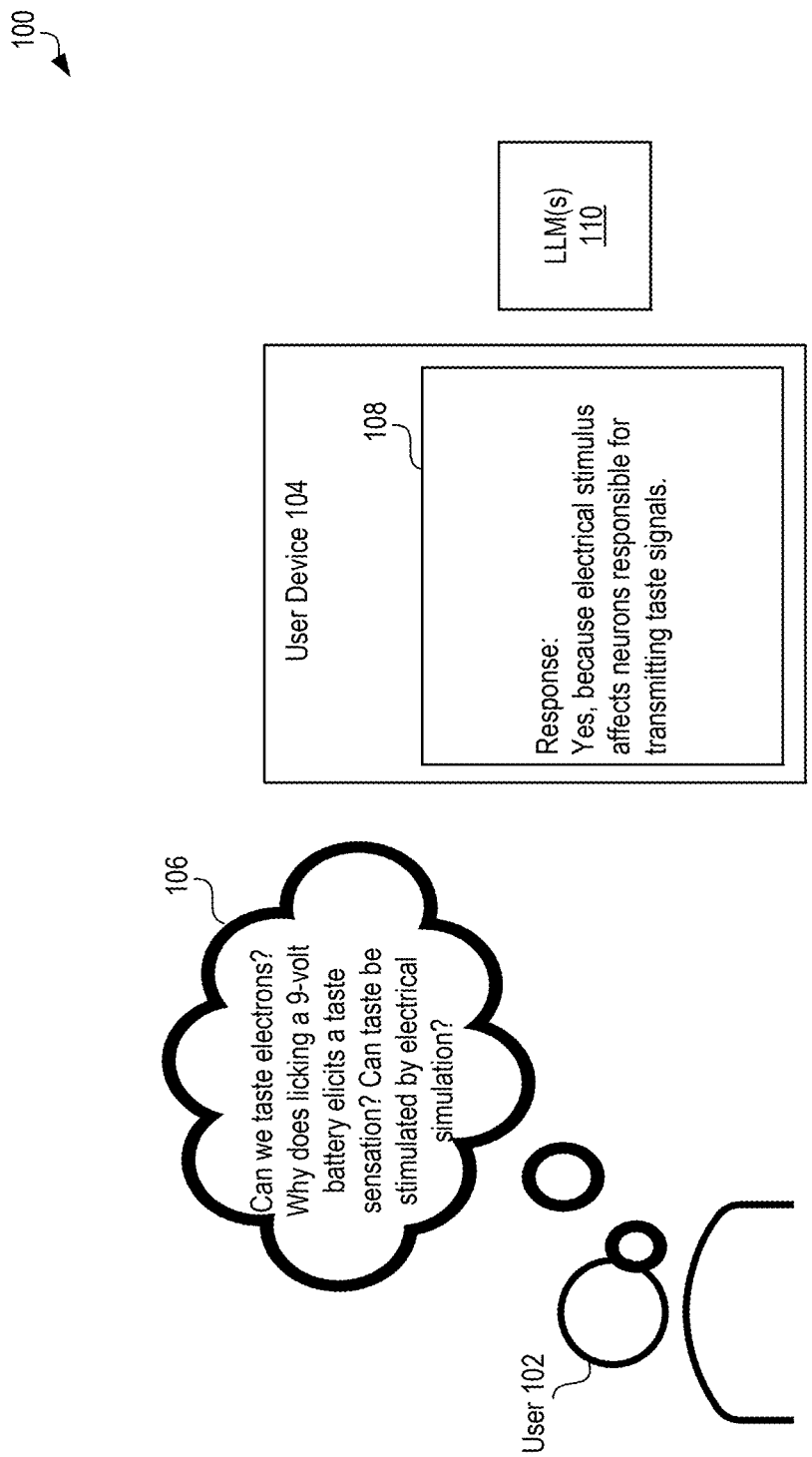
FIG. 1 shows an application of an LLM based AI conversation agent, according to embodiments of the present disclosure.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

As used herein, the term "Transformer" may refer to an architecture of a deep learning model designed to process sequential data, such as text, using a mechanism called self-attention. The Transformer architecture handles an entire input sequence of tokens (such as words, letters, symbols, etc.) in parallel, and often generate an output sequence of tokens sequentially. The Transformer architecture may comprise a stack of Transformer layers, each of which contains a self-attention module to weigh the importance of each token relative to other tokens in the sequence and a feed-forward module to further transform the data. Additional details of how a Transformer neural network model processes input data to generate an output is provided in relation to FIG. 4B As used herein, the term "Large Language Model" (LLM) may refer to a neural network based deep learning system designed to understand and generate human languages. An LLM may adopt a Transformer architecture that often entails a significant amount of parameters (neural network weights) and computational complexity. For example, LLM such as Generative Pre-trained Transformer (GPT) 3 has 175 billion parameters, Text-to-Text Transfer Transformers (T5) has around 11 billion parameters. An LLM may comprise an architecture of mixed software and/or hardware, e.g., including an application-specific integrated circuit (ASIC) such as a Tensor Processing Unit (TPU).

As used herein, the term "generative artificial intelligence (AI)" may refer to an AI system that outputs new content that does not pr-exist in the input to such AI system. The new content may include text, images, music, or code. An LLM is an example generative AI model that generate tokens representing new words, sentences, paragraphs, passages, and/or the like that do not pre-exist in an input of tokens to such LLM. For example, when an LLM generate a text answer to an input question, the text answer contains words and/or sentences that are literally different from those in the input question, and/or carry different semantic meaning from the input question.

Overview

RAG LLM may first search a large database of documents to find the most relevant pieces of information based on an input query and then use a generative LLM to generate a contextually relevant text based on the input query and the retrieved information. However, it can be challenging for existing RAG LLM to generate responses for reasoning-intensive tasks because the RAG LLM lacks the cognitive processes that humans use to assess the retrieved documents for generating the text.

Embodiments described herein provide a RAG LLM that performs a series of operations according to a reasoning process to generate a response to a user query. The reasoning process includes reranking a plurality of documents from a first-stage retrieval based on the relevance different from that of the first-stage retrieval between the documents and the user query. In this way, the RAG LLM improves on reasoning capabilities to generate accurate responses for reasoning-intensive tasks. Specifically, the LLM is provided with instructions to (1) analyze a user query, (2) analyze a plurality of documents from a first-stage retrieval, and (3) rank the documents based on their relevance to the user query. The LLM then provides a set of re-ranked documents as an output, based on which a text-generation LLM to generate a response to the user query. The provided data pipeline framework can more accurately identify relevant documents to a user query, and the AI chat agent can be more adaptive to answering reasoning-intensive questions.

Specifically, during this re-ranking process, instead of using the LLM to process ad generate reasoning outputs for the entirety of each relevant document, an LLM may generate a summary of a relevant document from the first-stage retrieval, and a reasoning output explaining why the first summary is relevant to the user question. As fewer tokens (the length of the summary is shorter than the original document) are processed and generated by the LLM, computational efficiency is improved. Similarly, to re-rank the set of retrieved documents, instead of feeding an entirety of each document to the LLM to generate a relevant score or a concatenation of all documents, the LLM may evaluate and generate a relevance score for each individual document based on an input of just the query and the reasoning output. In this way, the LLM again processes much fewer tokens than traditional relevance ranking process, which improves computational efficiency and hardware efficiency, as less GPU memories is required.

Embodiments described herein provide a number of benefits. For example, the reasoning of a RAG LLM can be improved. A RAG LLM can be configured to generate responses with improved accuracy and increased relevance to a user query. Therefore, with improved performance on RAG LLM, neural network technology in AI conversation agents (e.g., AI chatbots) in technical fields such as healthcare, network issue support, etc., is improved.

FIG. 1 shows an application 100 of an LLM based AI agent, according to embodiments of the present disclosure. A user 102 may utter a query 106 in natural language. In response, a user device 104 may output/display an answer 108 on a display interface, such as a screen. In some embodiments, answer 108 is the output of an artificial intelligence (AI) agent, which is built on a AI agent server that is communicatively connected to user device 104. The AI agent may be based on, or include, an LLM. In some embodiments, the LLM receives query 106 through utterance of user 102, which may retrieve a corpus of documents, and generate an output based on the retrieved documents.

As an example, query 106 may include a question of "Can we taste electrons? Why does licking a 9-volt battery elicits a taste sensation? Can taste be stimulated by electrical simulation?" The AI agent may include the query 106 in a predefined format providing instruction to the LLM how to generate a response to query 106, referred to as a "prompt," which may be fed to an LLM as input. The LLM 110 may in turn provide answer 108, e.g., a summary of the types of medical coverages in a predetermined format, e.g., a bullet-point format, such that one type of medical coverage is listed behind a bullet-point. In some aspects, for example, a citation of document(s) that mentioned the medical coverage is provided behind the respective bullet.

Figure 2A:
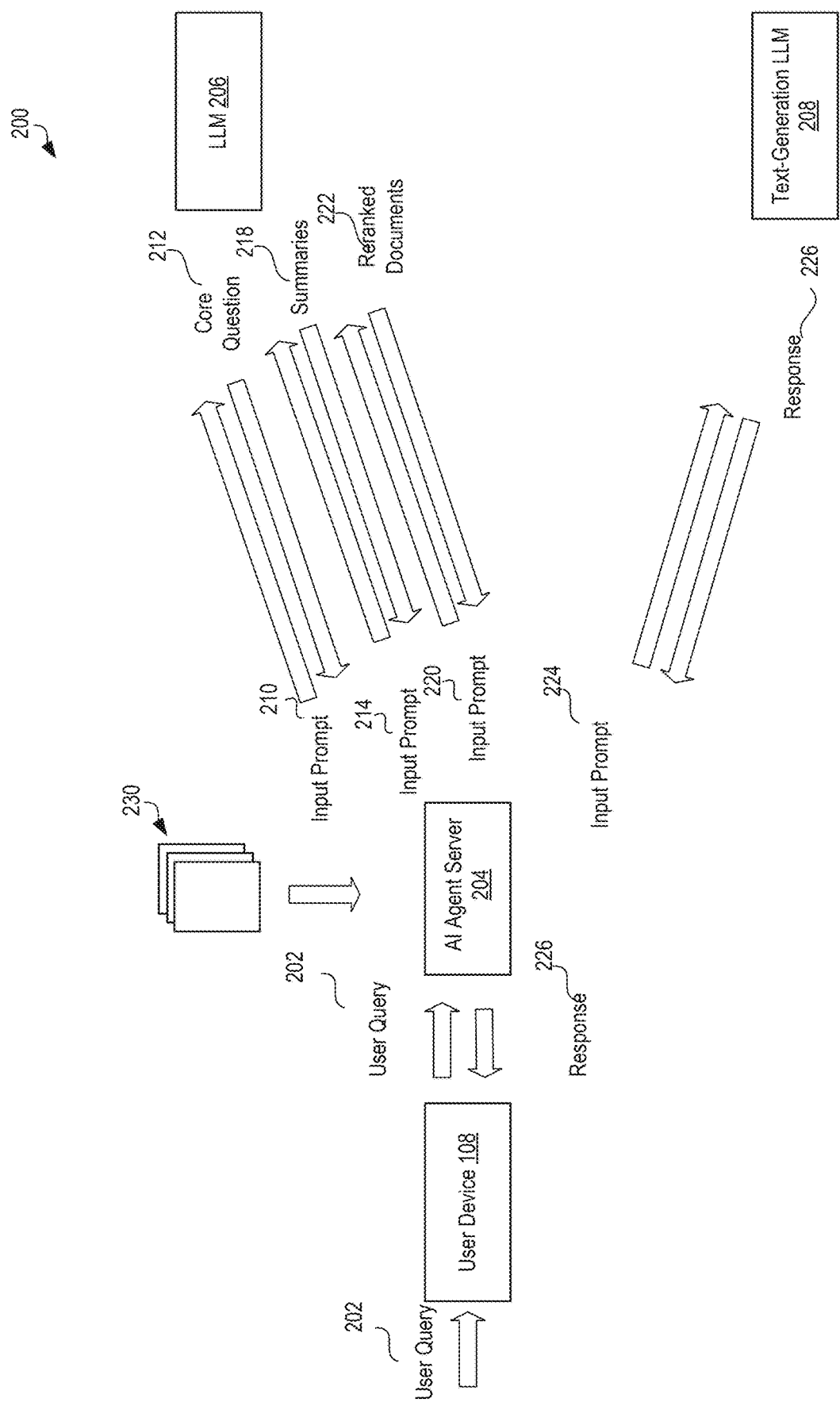
FIG. 2A is a simplified diagram illustrating a AI agent framework 100, according to some embodiments.
Figure 2B:
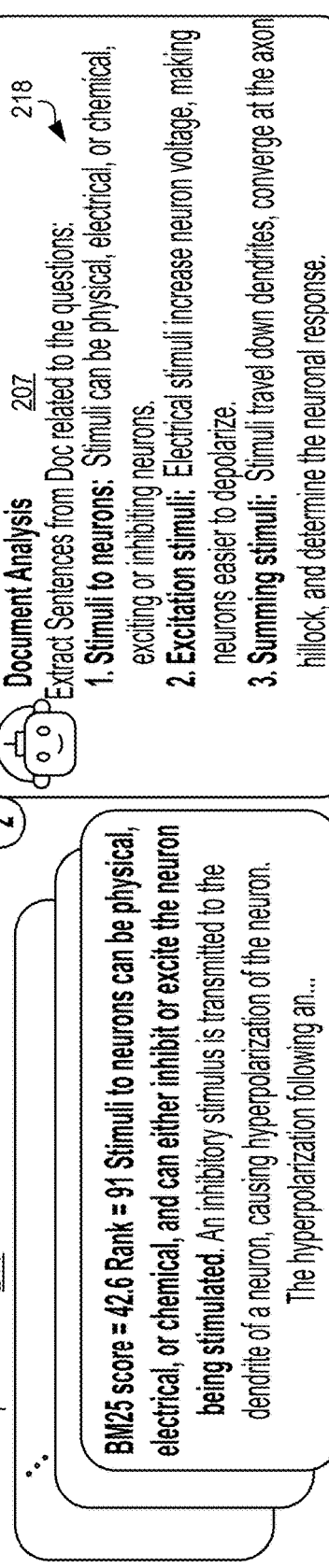
FIG. 2B shows certain operations performed by AI agent framework 100, according to some embodiments.

FIG. 2A is a simplified diagram illustrating a AI agent framework 200 according to some embodiments. The framework 200 comprises a AI agent server 204, a LLM 206, and a text-generation LLM 208. AI agent server 204 may be operatively connected to a user device 108, LLM 206, and text-generation LLM 208 through respective application programming interfaces (APIs). In some embodiments, AI agent server 204 may include a chatbot that respond to a user query with a response 108. LLM 206 may include a LLM configured to perform zero-shot context learning. In some embodiments, LLM 206 is not pretrained. FIG. 2B shows certain operations performed by AI agent framework 200.

User device 108 may be installed with an API, and may be communicatively connected to AI agent server 204 through the API. At inference stage, user device 108 may receive a user query 202 from a user's utterance, and may transmit user query 202 to AI agent server 204 through the API.

AI agent server 204 may receive user query 202 and generate an input prompt 210 based on the user query 202. In some embodiments, input prompt 210 may combine query 202 and an instruction that causes LLM 206 to analyze user query 202 and generate a core question 212 of user query 202 to filter out irrelevant texts from user query 202. In some embodiments, a core question includes a selected sentence from user query 202 that represents user query 202. In some embodiments, input prompt 210 causes LLM 206 to generate a key questions of query question 202. The key question may include a summary and/or a paraphrased sentence of the core question, and may be better understood by LLM 206. In various embodiments, input prompt 210 depends only on user query 220 and can be generated separately and stored. Since the number $n_q$ of user queries is often much smaller than the number nd of documents ($n_q \ll nd$), in some embodiments, a more expensive LLM (e.g., GPT-4, GPT-4o, etc.) may be used to perform this query analysis operation. Input prompt 210 may be referred to as a "query analysis prompt" that causes LLM 206 to perform a "query analysis" operation 205 as shown in FIG. 2B. FIG. 3A shows a query analysis prompt 302, e.g., an example of input prompt 210.

Upon receiving input prompt 210, LLM 206 may generate core question 212 (and/or a key question) and transmit it to AI agent server 204 via the respective API.

Upon receiving core question 212 (and optionally a key question), AI agent server 204 may access a set of preranked documents 230, which may include a plurality of documents obtained from a first-stage retrieval, and may be ranked in a first order based on a first type of relevance score. For example, preranked documents 230 may be ranked by BM25 score (Stephen E Robertson, Steve Walker, Susan Jones, Micheline M Hancock-Beaulieu, Mike Gatford, et al. 1995. Okapi at trec-3. Nist Special Publication Sp, 109:109; Stephen Robertson, Hugo Zaragoza, et al. 2009. The probabilistic relevance framework: Bm25 and be-yond. Foundations and Trends® in Information Retrieval, 3(4):333-389). In some embodiments, the first type of relevance score also include other suitable types of relevance scores such as Cosine similarity between the embedding s of a document and a user query. AI agent server 204 may generate an input prompt 214 that combines user query 202, core question 212 (any optionally a key question), preranked documents 230, and an instruction that causes LLM 206 to generate summaries 218, each from a respective one of preranked documents 230. Input prompt 214 may be referred to as a "document analysis prompt" that causes LLM 206 to perform a "document analysis" operation 207, as shown in FIG. 2B. FIG. 3A show a document analysis prompt 304, e.g., an example of input prompt 214.

Summaries 218 may help AI agent framework 200 answer user query 202, and may be used to assess the overall relevance of preranked documents 230. Summaries 218 may include summarizations of a respective one of preranked documents 230. In some embodiments, summaries 218 may include extractive summaries of respective preranked documents 230. As shown in FIG. 2B, preranked documents 230 may include retrieved top-k documents 211 from first-stage retrieval. In some embodiments, retrieved top-k documents 211 are preranked based on their BM25 scores. Document analysis operation 207 may include extracting sentences from documents related to the questions. For example, summaries 218 may include one or more sentences (e.g., "Stimuli can be physical, electrical, or chemical, exciting or inhibiting neurons.") extracted from retrieved top-k documents 211. In some embodiments, summaries 218 also includes a reasoning explanation (e.g., "stimuli to neurons") corresponding to the extracted sentence on why the sentence can address core question 212. LLM 206 may transmit summaries 218 to AI agent server 204 through the respective API.

Upon receiving summaries 218, AI agent server 204 may generate an input prompt 220 that combines user query 202, core question 212, preranked documents 230, summaries 218, and an instruction that causes LLM 206 to generate a set of reranked documents 222. Reranked documents 222 may be ranked in an order based on a second type of relevance that is different from the first type of relevance. Input prompt 220 may also be referred to as a "judgement prompt" that causes LLM 206 to perform a "relevance judgement" operation 209. FIG. 3B shows an example of a judgement prompt 306, which is an example of input prompt 220. In an example, input prompt 220 may cause LLM 206 to output a one-word judgement, either "yes" or "no," on the relevance of a document.

In relevance judgement operation 209, LLM 206 may determine a relevance score of the second type for each of preranked documents 230, and rerank them to output reranked documents 222. In some embodiments, compared to existing ranking methods that ranks a plurality of documents at once, scoring each document at a time followed by ranking the scores require much less computing power. In various embodiments, preranked documents 230 are scored using a discrete method, a continuous method, and a hybrid method.

In some embodiments, LLM 206 may perform a discrete method to rank preranked documents 230. LLM 206 may create a binary partition between accepted (when LLM 206 outputs a "Yes") and rejected (when LLM 206 outputs a "No") documents, maintaining the first-stage retrieval ranking within each category. More specifically, let $D=\{d_1, d_2, \ldots, d_k\}$ be an ordered list of top-k documents of preranked documents 230 ranked in the first-stage retrieval. Let $D_y$ and $D_n$ be a partition of D, such that $$D_y \cup D_n = D \quad (1)$$

$$D_y \cap D_n = \emptyset \quad (2)$$

$D_y$ is the set of documents that LLM 206 judged as relevant and $D_n$ is the set of documents that LLM 206 judged as non-relevant. Let R be the reranking function which maps each document d to its rank (lower rank means "more relevant"), then $$\forall d \in D_y \text{ and } d' \in D_n, R(d) < R(d') \quad (3)$$

and for the relative ranking within each partition, $$\forall d_i, d_j \in D_y, R(d_i) < R(d_j) \Leftrightarrow R_0(d_i) < R_0(d_j) \quad (4)$$

where R(d) is the final rank of document d and $R_0(d)$ is the rank of d from the first-stage retrieval. The same applies to $D_n$.

In some embodiments, LLM 206 may perform a continuous method to rank preranked documents 230. For the continuous method, LLM 206 may compute the probability of the "Yes" judgment $p_y$ of a document and the probability of the "No" judgment $p_n$ of the document to construct a complete ranking. This is similar to the relevance generation approach proposed in Liang et al. (Percy Liang, Rishi Bommasani, Tony Lee, Dimitris Tsipras, Dilara Soylu, Michihiro Yasunaga, Yian Zhang, Deepak Narayanan, Yuhuai Wu, Ananya Kumar, Benjamin Newman, Binhang Yuan, Bobby Yan, 2023). The scoring function S is defined by normalizing the probabilities between $p_y$ and $p_n$ as follows:

$$S(d) = \frac{P_y}{P_y + P_n} \quad (5)$$

In some embodiments, the normalization step is necessary because the combined probability mass S(d) allocated to $p_y$ and $p_n$ is not always a fixed value across different documents. Without normalization, the $p_y$ values for different documents may not be directly comparable.

The final ranking $D_R$ is then defined as $D_R=\{d_1, d_2, \ldots, d_k\}$ such that $$\forall i,j \in \{1,2,\ldots,k\}, i<j \Leftrightarrow S(d_i) > S(d_j) \quad (6)$$

This continuous method may provide a more fine-grained ranking compared to the binary partition, as it utilizes the full range of probabilities output by LLM 206.

In some embodiments, LLM 206 may perform a hybrid method to rank preranked documents 230. The final score is computed by taking a weighted sum of the probability score $S_{prob}$ (e.g., computed from the continuous method) and the relevance score from the first-stage retrieval. In some embodiments, the relevance score from the first-stage retrieval may include BM25 score $S_{BM25}$. More specifically, LLM 206 may compute the final score S by:

$$S = \alpha S_{prob} + S_{BM25} \quad (7)$$

where $S_{BM25}$ is the score provided by BM25 in the first-stage retrieval, and a is the relative weight of the probability score. As an example, a is set to be 100 in to bring $S_{prob}$ to the same scale as $S_{BM25}$. This hybrid method may leverage model ensembling to consider both reasoning and surface-level matching, thus marrying the benefits of both approaches.

In some embodiments, the document analysis operation 207 and relevance judgement operation 209 may each be performed by a LLM that is smaller and less costly than the LLM used for query analysis operation 205. For example, document analysis operation 207 and/or relevance judgement operations 209 may be performed by LLaMA, Claude, etc.

In some embodiments, reranked documents 222 includes a reordered set of preranked documents 230. Upon receiving reranked documents 222, AI agent server 204 may generate an input prompt 224 that combines user query 202, reranked documents 222, and an instruction that causes text-generation LLM 208 to generate a response 226 in response to user query 202. LLM 208 may generate response 226 based on one or more of reranked documents 222. For example, LLM 228 may generate response 226 based on top-m (m≤k) of reranked documents 222. In some embodiments, LLM 208 includes a suitable neural network based language model such as GPT-3.5, GPT-4o, etc. LLM 208 may transmit response 226 to AI agent server 204 via the respective API.

Upon receiving response 226, AI agent server 204 may transmit response 226 to user device 108 via the respective API. User device 108 may display response 226 at a user interface, such as a display screen, for user 102's view.

In some embodiments, input prompts 210 (e.g., 302), 214 (e.g., 304), and 220 (e.g., 306) include natural language and are highly generalizable. To adapt them to a new reranking task, one only needs to replace the query name, the document name, and the relation between them. Leveraging LLM in a zero-shot setting allow developers to flexibly define the relation between the user query and the document.

In some embodiments, user query 202 may include a task query that includes a query to identify an information technology (IT) anomaly relating to a usage of an IT component. The method may further include determining that the updated action execution state representing an information technology anomaly, and causing an alert relating to the information technology anomaly to be displayed at a visualized user interface.

Computer and Network Environment

Figure 4A:
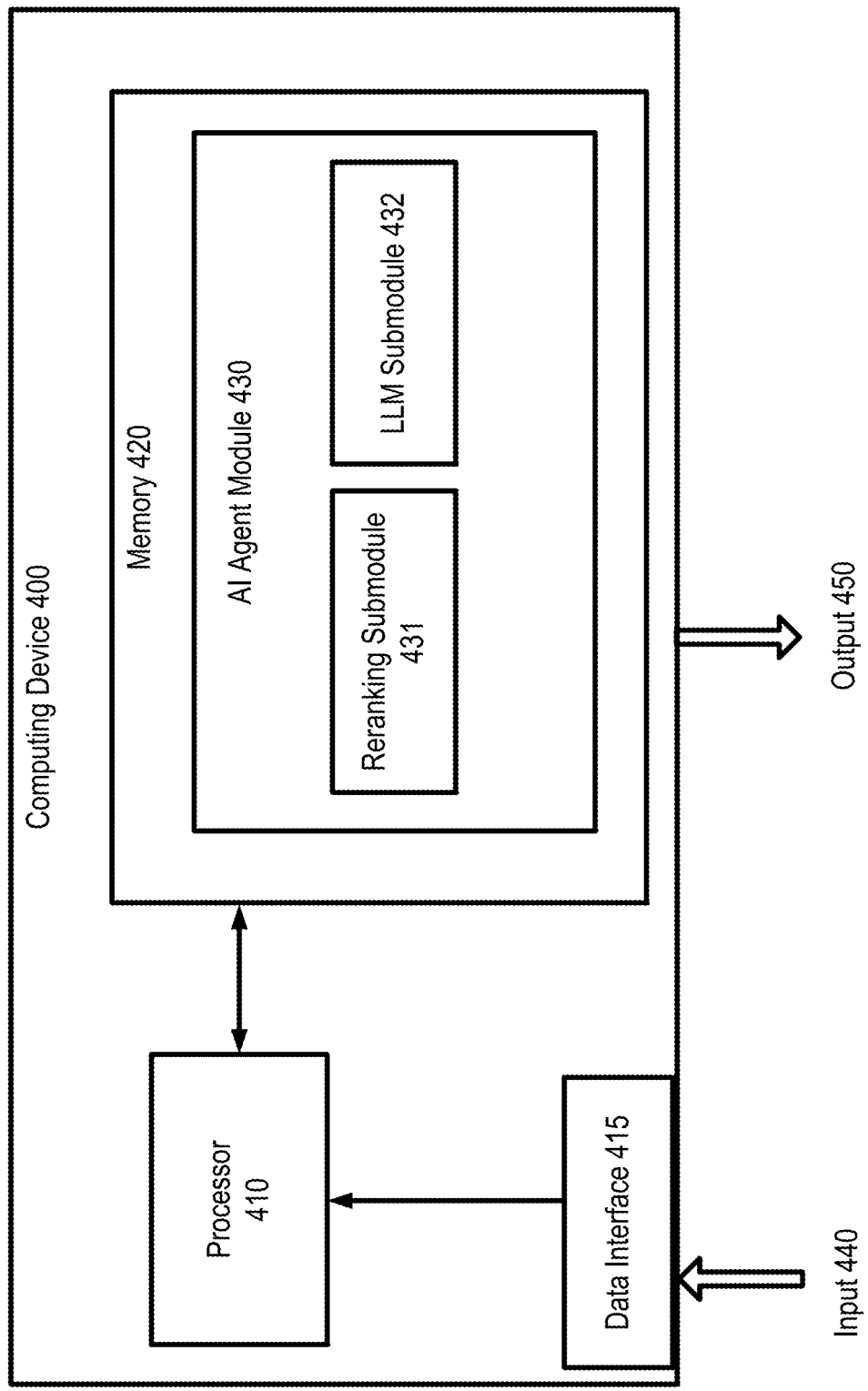
FIG. 4A is a simplified diagram illustrating a computing device implementing the AI agent framework described in FIGS. 1-3, according to some embodiments.

FIG. 4A is a simplified diagram illustrating a computing device implementing the AI agent framework described in FIGS. 1-3, according to one embodiment described herein. As shown in FIG. 4A, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

Figure 4B:
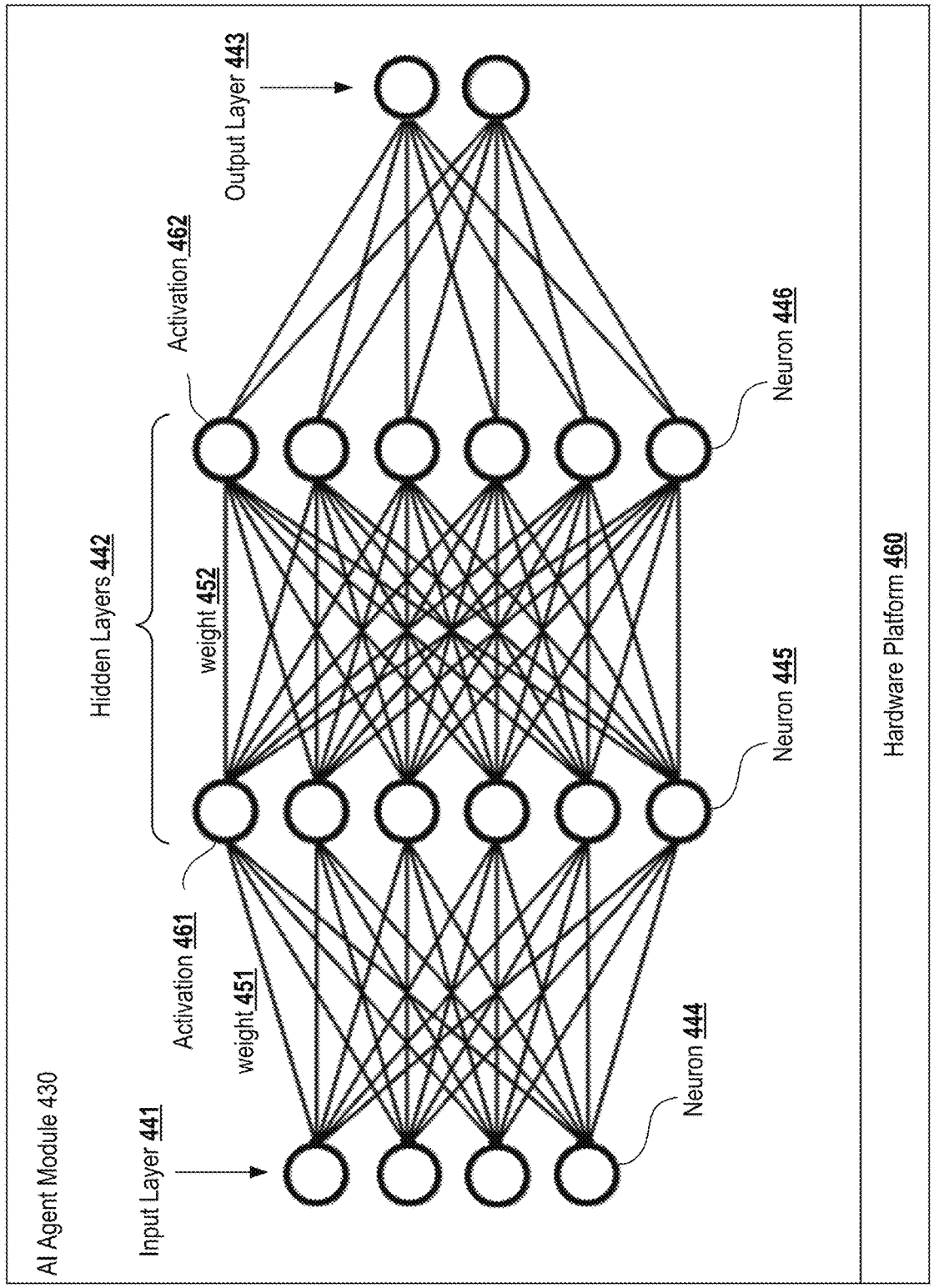
FIG. 4B is a simplified diagram illustrating a neural network structure, according to some embodiments.

In another embodiment, processor 410 may comprise multiple microprocessors and/or memory 420 may comprise multiple registers and/or other memory elements such that processor 410 and/or memory 420 may be arranged in the form of a hardware-based neural network, as further described in FIG. 4B.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for AI agent module 430 that may be used to implement and/or emulate the systems and models, and/or to implement any of the methods described further herein. AI agent module 430 may receive input 440 such as an input training data (e.g., user query 202) via the data interface 415 and generate an output 450 which may be response 226.

The data interface 415 may comprise a communication interface, a user interface (such as a voice input interface, a graphical user interface, and/or the like). For example, the computing device 400 may receive the input 440 (such as a training dataset) from a networked database via a communication interface. Or the computing device 400 may receive the input 440, such as user query 202, from a user via the user interface.

In some embodiments, the AI agent module 430 is configured to generate a response in response to a user query. The AI agent module 430 may further include a reranking submodule 431 and a LLM submodule 432. Submodules 431 and 432 may perform similar functions as AI agent server 204 in FIG. 2A. Reranking submodule 431 may be configured to generate input prompts (e.g., 210, 214, and 220) that cause LLM 206 to generate core question 212, summaries 218, and a set of reranked documents 222, based on a user query (e.g., 202) and a set of preranked documents (e.g., 230). LLM submodule 432 may be configured to generate an input prompt (e.g., 224) that causes text-generation LLM 208 to generate a response (e.g., 226) conditioned on the user query (e.g., 202) and the set of reranked documents (e.g., 222) generated by reranking submodule 431.

Some examples of computing devices, such as computing device 400 may include non-transitory, tangible, machine readable media that include executable code that when run by one or more processors (e.g., processor 410) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

FIG. 4B is a simplified diagram illustrating the neural network structure implementing the AI agent module 430 described in FIG. 4A, according to some embodiments. In some embodiments, the AI agent module 430 and/or one or more of its submodules 431-432 may be implemented at least partially via an artificial neural network structure shown in FIG. 4B. The neural network comprises a computing system that is built on a collection of connected units or nodes, referred to as neurons (e.g., 444, 445, 446). Neurons are often connected by edges, and an adjustable weight (e.g., 451, 452) is often associated with the edge. The neurons are often aggregated into layers such that different layers may perform different transformations on the respective input and output transformed input data onto the next layer.

For example, the neural network architecture may comprise an input layer 441, one or more hidden layers 442 and an output layer 443. Each layer may comprise a plurality of neurons, and neurons between layers are interconnected according to a specific topology of the neural network topology. The input layer 441 receives the input data (e.g., 440 in FIG. 4A), such as user query 202. The number of nodes (neurons) in the input layer 441 may be determined by the dimensionality of the input data (e.g., the length of a vector of user query 202). Each node in the input layer represents a feature or attribute of the input.

The hidden layers 442 are intermediate layers between the input and output layers of a neural network. It is noted that two hidden layers 442 are shown in FIG. 4B for illustrative purpose only, and any number of hidden layers may be utilized in a neural network structure. Hidden layers 442 may extract and transform the input data through a series of weighted computations and activation functions.

For example, as discussed in FIG. 4A, the AI agent module 430 receives an input 440 of user query 202 and transforms the input into an output 450 of response 226. To perform the transformation, each neuron receives input signals, performs a weighted sum of the inputs according to weights assigned to each connection (e.g., 451, 452), and then applies an activation function (e.g., 461, 462, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 441 is transformed into rather different values indicative data characteristics corresponding to a task that the neural network structure has been designed to perform.

The output layer 443 is the final layer of the neural network structure. It produces the network's output or prediction based on the computations performed in the preceding layers (e.g., 441, 442). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the AI agent module 430 and/or one or more of its submodules 431-432 may comprise the transformative neural network structure of layers of neurons, and weights and activation functions describing the non-linear transformation at each neuron. Such a neural network structure is often implemented on one or more hardware processors 410, such as a graphics processing unit (GPU). An example neural network may be GPT-4, GPT-3.5, and/or the like.

In one embodiment, the AI agent module 430 and its submodules 431-432 may comprise one or more LLMs built upon a Transformer architecture. For example, the Transformer architecture comprises multiple layers, each consisting of self-attention and feedforward neural networks. The self-attention layer transforms a set of input tokens (such as words) into different weights assigned to each token, capturing dependencies and relationships among tokens. The feedforward layers then transform the input tokens, based on the attention weights, represents a high-dimensional embedding of the tokens, capturing various linguistic features and relationships among the tokens. The self-attention and feedforward operations are iteratively performed through multiple layers of self-attention and feedforward layers, thereby generating an output based on the context of the input tokens. One forward pass for an input tokens to be processed through the multiple layers to generate an output in a Transformer architecture often entail hundreds of teraflops (trillions of floating-point operations) of computation.

For example, the Transformer-based architecture may process an input sequence of tokens (e.g., letters, symbols, numbers, signs, words, etc.) using its encoder-decoder architecture (for tasks such as machine translation, etc.) or just the encoder (for classification tasks) or decoder (for generation-only tasks). First, the input sequence may be tokenized and converted into embeddings, which are dense numerical representations, e.g., vectors of values. Positional encodings are added to these embeddings to provide information about the order of tokens.

The Transformer encoder, usually consisting of multiple layers, each of which may processes the input using a multi-head self-attention mechanism to capture relationships between tokens and a feed-forward network to transform the information, resulting in encoded representations of the input sequence of tokens.

For example, the multi-head self-attention mechanism at each Transformer layer within the Transformer encoder of an LLM may project input embeddings at the layer into three different embedding spaces using weight matrices, referred to as Query (Q) representing what a token wants to attend to, Key (K) representing what this token offers as information and Value (V) representing the actual information carried by the token. The Q K, V matrices contain tunable weights of a Transformer-based language model that are updated during training. Then, the attention mechanism computes attention scores between all tokens in the input sequence using the Q, K and V matrices. The resulting attention scores are then used to generate encoded representations of the input sequence of tokens.

Similarly, the Transformer decoder may comprise a symmetric structure with the encoder, consisting of multiple layers, each of which may comprise a multi-head self-attention mechanism. The decoder may start with a special start token and use the multi-head self-attention mechanism, augmented with encoder-decoder attention to focus on relevant parts of the decoder input. The decoder may generate output tokens one by one, with each step using the previously generated tokens as part of the input and updated attention weights. Finally, the decoder may comprise a linear layer and softmax function predict probabilities for the next token in the sequence, selecting the most likely one to continue the output. This process repeats until a special end token is generated or a length limit is reached.

The generated sequence of tokens may jointly represent an output. For example, a Transformer-based LLM (such as LLM 110a-d) may receive a natural language input (such as a question) and generate a natural language output (such as an answer to the question).

In one embodiment, the AI agent module 430 and its submodules 431-432 may be implemented by hardware, software and/or a combination thereof. For example, the AI agent module 430 and its submodules 431-432 may comprise a specific neural network structure implemented and run on various hardware platforms 460, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 460 used to implement the neural network structure is specifically configured based on factors such as the complexity of the neural network, the scale of the tasks (e.g., training time, input data scale, size of training dataset, etc.), and the desired performance.

For example, to deploy the AI agent module 430 and its submodules 431-432 and/or any other neural network models such as LLMs 206 and 208 described in FIGS. 2A and 4 onto hardware platform 460, the neural network based modules 430 and its submodules 431-432 may be optimized for deployment by converting it to a suitable format, such as ONNX or TensorRT, to improve performance and compatibility. Next, depending on the size and workload requirements for modules 430 and its submodules 431-432, hardware types may be chosen for deployment, e.g., processing capacity, GPU memory size, and/or the like. Frameworks and drivers for the chosen hardware 460 frameworks and drivers may thus be installed, such as PyTorch, TensorFlow, or CUDA, to support the hardware platform 460. Then, weights and parameters of the AI agent module 430 and its submodules 431-432 may be loaded to the hardware 460. For large-scale deployments (e.g., with billions of weights for example), distributed computing frameworks may be used to handle model partitioning across multiple devices, e.g., hardware processors such as GPUs may be distributed on multiple devices, each handling a portion of weights of the model and therefore would undertake a portion of computational workload. In some embodiments, the AI agent module 430 and its submodules 431-432 may be deployed as a service, then they may be integrated with an API endpoint, using tools like Flask, FastAPI, or a cloud platform serverless services, and is accessible by a remote user via a network.

In another embodiment, some or all of layers 441, 442, 443 and/or neurons 442, 445, 446, and operations there between such as activations 461, 462, and/or the like, of the AI agent module 430 and its submodules 431-432 may be realized via one or more ASICs. For example, each neuron 442, 445 and 446 may be a hardware ASIC comprising a register, a microprocessor, and/or an input/output interface. For another example, operations among the neurons and layers may be implemented through an ASIC TPU. For yet another example, some operations among the neurons and layers such as a softmax operation, an activation function (such as a rectified linear unit (ReLU), sigmoid linear unit (SiLU), and/or the like) may be implemented by one or more ASICs.

For example, the AI agent module 430 may generate, by at least one ASIC (such as a TPU, etc.) performing a multiplicative and/or accumulative operation for a neural network language model, a next token based at least in prat on previously generated tokens, and in turn generate a natural language output representing the next-step action combining a sequence of generated tokens.

In one embodiment, the neural network based AI agent module 430 and one or more of its submodules 431-432 may be trained by iteratively updating the underlying parameters (e.g., weights 451, 452, etc., bias parameters and/or coefficients in the activation functions 461, 462 associated with neurons) of the neural network based on a loss. For example, during forward propagation, the training data such as user query 202 are fed into the neural network. The data flows through the network's layers 441, 442, with each layer performing computations based on its weights, biases, and activation functions until the output layer 443 produces the network's output 450. In some embodiments, output layer 443 produces an intermediate output on which the network's output 450 is based.

The output generated by the output layer 443 is compared to the expected output (e.g., a "ground-truth" such as the corresponding responses labeled as correct responses) from the training data, to compute a loss function that measures the discrepancy between the predicted output and the expected output. For example, the loss function may be, e.g., cross entropy, MMSE, or a combination. Given the loss, the negative gradient of the loss function is computed with respect to each weight of each layer individually. Such negative gradient is computed one layer at a time, iteratively backward from the last layer 443 to the input layer 441 of the neural network. These gradients quantify the sensitivity of the network's output to changes in the parameters. The chain rule of calculus is applied to efficiently calculate these gradients by propagating the gradients backward from the output layer 443 to the input layer 441.

In one embodiment, the neural network based AI agent module 430 and one or more of its submodules 431-432 may be trained using policy gradient methods, also referred to as "reinforcement learning" methods. For example, instead of computing a loss based on a training output generated via a forward propagation of training data, the "policy" of the neural network model, which is a mapping from an input of the current states or observations of an environment the neural network model is operated at, to an output of action. Specifically, at each time step, a reward is allocated to an output of action generated by the neural network model. The gradients of the expected cumulative reward with respect to the neural network parameters are estimated based on the output of action, the current states of observations of the environment, and/or the like. These gradients guide the update of the policy parameters using gradient descent methods like stochastic gradient descent (SGD) or Adam. In this way, as the "policy" parameters of the neural network model may be iteratively updated while generating an output action as time progresses, the boundaries between training and inference are often less distinct compared to supervised learning—in other words, backward propagation and forward propagation may occur for both "training" and "inference" stages of the neural network mode.

In some embodiments, AI agent module 430 and its submodules 431-432 may be housed at a centralized server (e.g., computing device 400) or one or more distributed servers. For example, one or more of AI agent module 430 and its submodules 431-432 may be housed at external server(s). The different modules may be communicatively coupled by building one or more connections through application programming interfaces (APIs) for each respective module. Additional network environment for the distributed servers hosting different modules and/or submodules may be discussed in FIG. 5.

During a backward pass, parameters of the neural network are updated backwardly from the last layer to the input layer (backpropagating) based on the computed negative gradient using an optimization algorithm to minimize the loss. The backpropagation from the last layer 443 to the input layer 441 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as generating a response to a user query.

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters.

In some implementations, to improve the computational efficiency of training a neural network model, "training" a neural network model such as an LLM may sometimes be carried out by updating the input prompt, e.g., the instruction to teach an LLM how to perform a certain task. For example, while the parameters of the LLM may be frozen, a set of tunable prompt parameters and/or embeddings that are usually appended to an input to the LLM may be updated based on a training loss during a backward pass. For another example, instead of tuning any parameter during a backward pass, input prompts, instructions, or input formats may be updated to influence their output or behavior. Such prompt designs may range from simple keyword prompts to more sophisticated templates or examples tailored to specific tasks or domains.

In general, the training and/or finetuning of an LLM can be computationally extensive. For example, GPT-3 has 175 billion parameters, and a single forward pass using an input of a short sequence can involve hundreds of teraflops (trillions of floating-point operations) of computation. Training such a model requires immense computational resources, including powerful GPUs or TPUs and significant memory capacity. Additionally, during training, multiple forward and backward passes through the network are performed for each batch of data (e.g., thousands of training samples), further adding to the computational load.

In general, the training process transforms the neural network into an "updated" trained neural network with updated parameters such as weights, activation functions, and biases. The trained neural network thus improves neural network technology in text generation.

Figure 5:
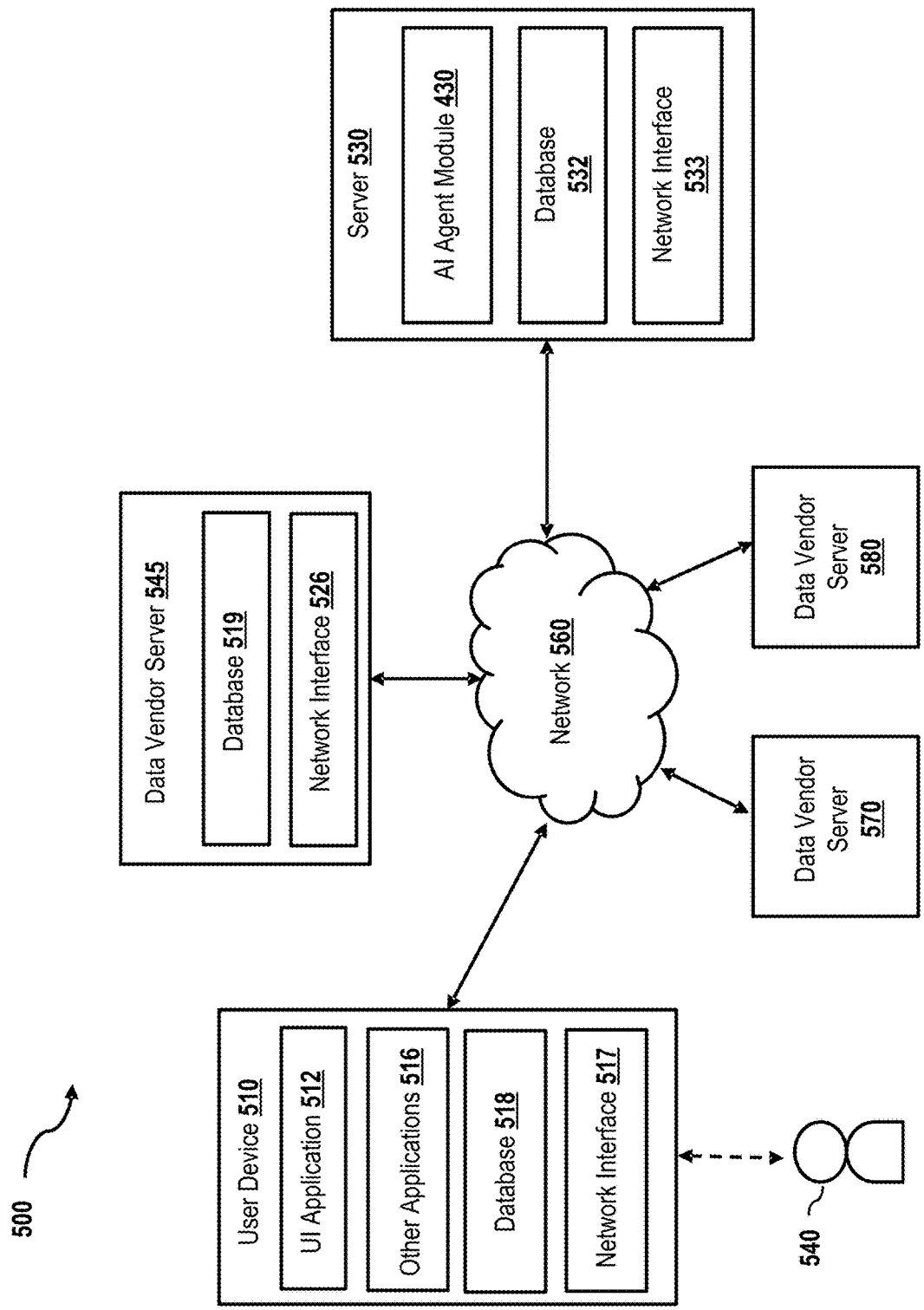
FIG. 5 is a simplified block diagram of a networked system suitable for implementing the AI agent framework described in FIGS. 1-3, 4A, and 4B and other embodiments described herein.

FIG. 5 is a simplified block diagram of a networked system 500 suitable for implementing the AI agent framework 200 described in FIGS. 1, 2A, 2B, 3, 4A, and 4B and other embodiments described herein. In one embodiment, system 500 includes the user device 510 which may be operated by user 540, data vendor servers 545, 570 and 580, server 530, and other forms of devices, servers, and/or software components that operate to perform various methodologies in accordance with the described embodiments. Exemplary devices and servers may include device, stand-alone, and enterprise-class servers which may be similar to the computing device 400 described in FIG. 4A, operating an OS such as a MICROSOFT® OS, a UNIX® OS, a LINUX® OS, or other suitable device and/or server-based OS. It can be appreciated that the devices and/or servers illustrated in FIG. 5 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 510, data vendor servers 545, 570 and 580, and the server 530 may communicate with each other over a network 560. User device 510 may be utilized by a user 540 (e.g., a driver, a system admin, etc.) to access the various features available for user device 510, which may include processes and/or applications associated with the server 530 to receive an output data anomaly report.

User device 510, data vendor server 545, and the server 530 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 500, and/or accessible over network 560.

User device 510 may be implemented as a communication device that may utilize appropriate hardware and software configured for wired and/or wireless communication with data vendor server 545 and/or the server 530. For example, in one embodiment, user device 510 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 510 of FIG. 5 contains a user interface (UI) application 512, and/or other applications 516, which may correspond to executable processes, procedures, and/or applications with associated hardware. For example, the user device 510 may receive a message indicating a response to a user query from the server 530 and display the message via the UI application 512. In other embodiments, user device 510 may include additional or different modules having specialized hardware and/or software as required.

In one embodiment, UI application 512 may communicatively and interactively generate a UI for an AI agent implemented through the AI agent module 430 (e.g., an LLM agent) at server 530. In at least one embodiment, a user operating user device 510 may enter a user utterance, e.g., via text or audio input, such as a question, uploading a document, and/or the like via the UI application 512. Such user utterance may be sent to server 530, at which AI agent module 430 may generate a response via the process described in FIGS. 2A, 2B, and 3. The AI agent module 430 may thus cause a display of a response such as "Yes, because electrical stimulus affects neurons responsible for transmitting taste signals" at UI application 512 and interactively update the display in real time with the user utterance.

In various embodiments, user device 510 includes other applications 516 as may be desired in particular embodiments to provide features to user device 510. For example, other applications 516 may include security applications for implementing client-side security features, programmatic client applications for interfacing with appropriate application programming interfaces (APIs) over network 560, or other types of applications. Other applications 516 may also include communication applications, such as email, texting, voice, social networking, and IM applications that allow a user to send and receive emails, calls, texts, and other notifications through network 560. For example, the other application 516 may be an email or instant messaging application that receives a prediction result message from the server 530. Other applications 516 may include device interfaces and other display modules that may receive input and/or output information. For example, other applications 516 may contain software programs for asset management, executable by a processor, including a graphical user interface (GUI) configured to provide an interface to the user 540 to view the response to a user query.

User device 510 may further include database 518 stored in a transitory and/or non-transitory memory of user device 510, which may store various applications and data and be utilized during execution of various modules of user device 510. Database 518 may store user profile relating to the user 540, predictions previously viewed or saved by the user 540, historical data received from the server 530, and/or the like. In some embodiments, database 518 may be local to user device 510. However, in other embodiments, database 518 may be external to user device 510 and accessible by user device 510, including cloud storage systems and/or databases that are accessible over network 560.

User device 510 includes at least one network interface component 517 adapted to communicate with data vendor server 545 and/or the server 530. In various embodiments, network interface component 517 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 545 may correspond to a server that hosts database 519 to provide training datasets including (user query, response) pairs to the server 530. The database 519 may be implemented by one or more relational database, distributed databases, cloud databases, and/or the like.

The data vendor server 545 includes at least one network interface component 526 adapted to communicate with user device 510 and/or the server 530. In various embodiments, network interface component 526 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 545 may send asset information from the database 519, via the network interface 526, to the server 530.

The server 530 may be housed with the AI agent module 430 and its submodules described in FIG. 4A. In some implementations, AI agent module 430 may receive data from database 519 at the data vendor server 545 via the network 560 to generate a response to a user query. The generated response may also be sent to the user device 510 for review by the user 540 via the network 560.

The database 532 may be stored in a transitory and/or non-transitory memory of the server 530. In one implementation, the database 532 may store data obtained from the data vendor server 545. In one implementation, the database 532 may store parameters of the AI agent module 430. In one implementation, the database 532 may store previously generated responses, and/or query analysis results, and the corresponding input feature vectors.

In some embodiments, database 532 may be local to the server 530. However, in other embodiments, database 532 may be external to the server 530 and accessible by the server 530, including cloud storage systems and/or databases that are accessible over network 560.

The server 530 includes at least one network interface component 533 adapted to communicate with user device 510 and/or data vendor servers 545, 570 or 580 over network 560. In various embodiments, network interface component 533 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 560 may be implemented as a single network or a combination of multiple networks. For example, in various embodiments, network 560 may include the Internet or one or more intranets, landline networks, wireless networks, and/or other appropriate types of networks. Thus, network 560 may correspond to small scale communication networks, such as a private or local area network, or a larger scale network, such as a wide area network or the Internet, accessible by the various components of system 500.

Example Work Flows

Figure 6:
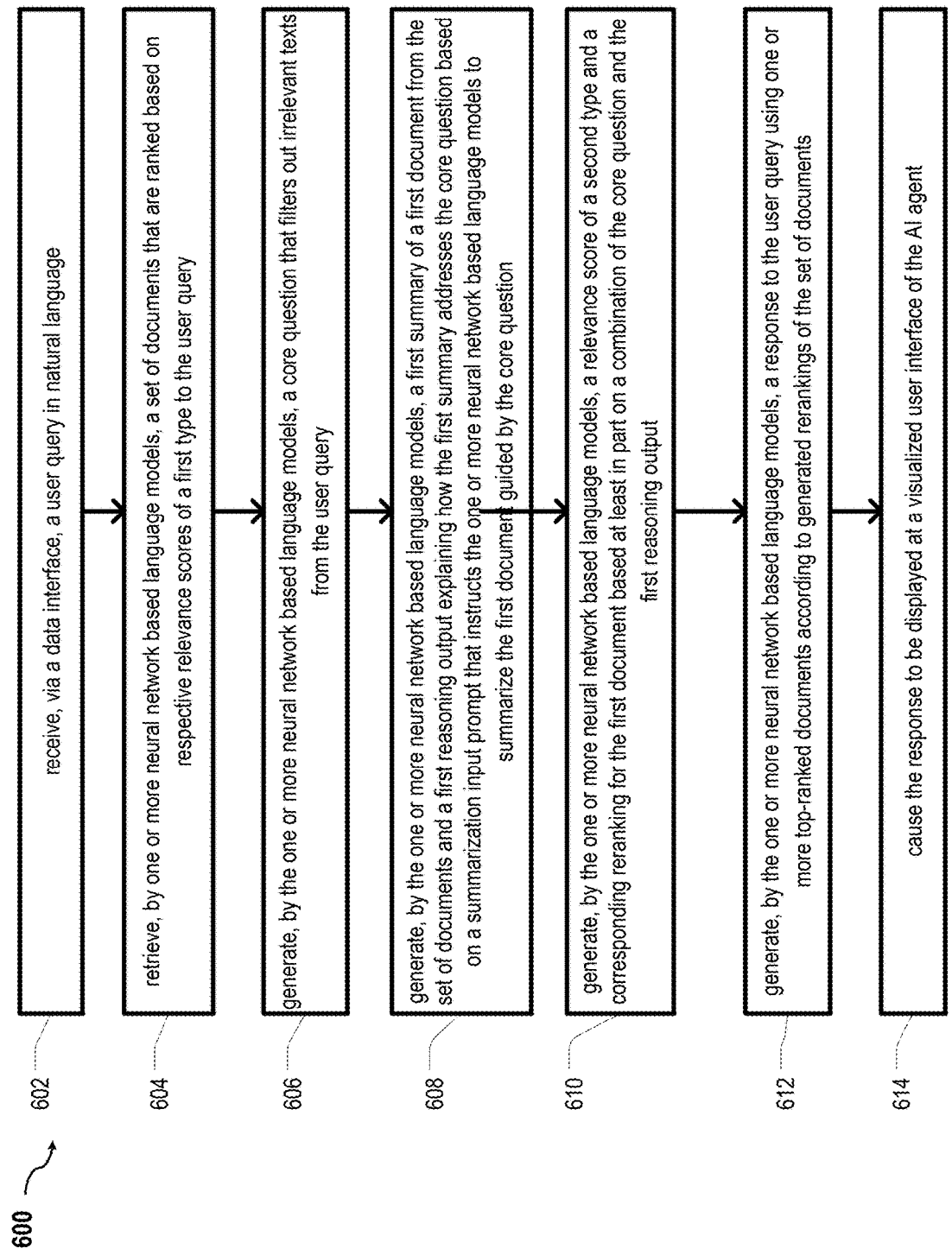
FIG. 6 is an example logic flow diagram illustrating a method of generating a response based on the framework shown in FIGS. 1-3, 4A, 4B, and 5, according to some embodiments.

FIG. 6 is an example logic flow diagram illustrating a method of building an AI agent to respond to a user query based on the framework shown in FIGS. 1, 2A, 2B, 23, 4A, 4B, and 5, according to some embodiments described herein. One or more of the processes of method 600 may be implemented, at least in part, in the form of executable code stored on non-transitory, tangible, machine-readable media that when run by one or more processors may cause the one or more processors to perform one or more of the processes. In some embodiments, method 600 corresponds to the operation of the AI agent module 430 (e.g., FIGS. 4A and 5) that performs response generation.

In some embodiments, method 600 is performed by a system such as computing device 400, user device 510, server 530, or another device or combination of devices. Inputs (e.g., user query 202) may be received via a data interface such as data interface 415, network interface 517, network interface 533, or via a data interface that is integrated with a device. For example, UI Application 512 may receive user inputs via a text input interface (e.g., keyboard), audio input (e.g., microphone), video interface (e.g., camera), or other interface for receiving user inputs (e.g., a mouse or touch display).

As illustrated, the method 600 includes a number of enumerated steps, but aspects of the method 600 may include additional steps before, after, and in between the enumerated steps. In some aspects, one or more of the enumerated steps may be omitted or performed in a different order.

At step 602, a user query (e.g., 202) in natural language is received via a data interface (e.g., 108).

At step 604, a set of documents (e.g., 230) that are ranked based on respective relevance scores of a first type to the user query are retrieved by one or more neural network based language models (e.g., 206). In some embodiments, the relevance scores of the first type includes BM25 relevance scores At step 606, a core question (e.g., 212) that filters out irrelevant texts from the user query is generated by one or more neural network based language models.

At step 608, a first summary (e.g., 218) of a first document and a first reasoning are generated by the one or more neural network based language models from the set of documents. The first reasoning output (e.g., 218) explains how the first summary addresses the core question based on a summarization input prompt (e.g., 214) that instructs the one or more neural network based language models to summarize the first document guided by the core question.

In some embodiments, the generating, by the one or more neural network based language models, the first summary of a first document from the set of documents includes: extracting one or more sentences from a respective document in the set of documents based on the summarization input prompt that instructs the one or more neural network based language models to extract the one or more sentences from the first document guided by the core question.

At step 610, a relevance score of a second type and a corresponding reranking for the first document are generated by the one or more neural network based language models based at least in part on a combination of the core question and the first reasoning output.

In some embodiments, the generating, by the one or more neural network based language models, the relevance score of a second type includes: generating a binary partition that separates one or more accepted documents and one or more rejected documents in the set of documents; maintaining the one or more accepted documents and the one or more rejected documents based on an order of the relevance scores of the first type; and determining the relevance score of the second type to be associated with the order.

In some embodiments, the generating, by the one or more neural network based language models, the relevance score of a second type includes: generating a first probability distribution of being accepted for a document of the set of documents and a second probability distribution of being rejected for the document; and generating the relevance score of the second type based on a normalization of the first probability distribution and the second probability distribution for the document.

In some embodiments, the generating, by the one or more neural network based language models, the relevance score of a second type includes: generating a first probability distribution of being accepted for a document of the set of documents and a second probability distribution of being rejected for the document; generating a first ranking score based on a normalization of the first probability distribution and the second probability distribution for the document; and generating the relevance score of the second type to be a weighted sum of the first ranking score and the relevance score of the first type.

At step 612, a response (e.g., 226) to the user query is generated by the one or more neural network based language models using one or more top-ranked documents according to generated rerankings of the set of documents.

In some embodiments, method 600 further includes building, at a server, the AI agent through one or more APIs to the one or more neural network based language models.

At step 614, the response is caused to be displayed at a visualized user interface (e.g., 108) of the AI agent (e.g., 204).

In some embodiments, the core question of the user query is generated by a first neural network based language model; and the first summary or the relevance score of the second type is generated by a second neural network based language model, wherein the first neural network based language model is larger than the second neural network based language model.

In some embodiments, method 600 is applicable in a variety of applications. For example, the task request received by a neural network model (e.g., 206 and/or 208) may relate to a diagnostic request in view of a medical record in a healthcare system, a curriculum designing request in an online education system, a code generation request in a software development system, a writing and/or editing request in a content generation system, an IT diagnostic request in an IT customer service support system, a navigation request in a robotic and autonomous system, and/or the like. By performing method 600, the neural network based artificial agent may improve technology in the respective technical field in healthcare and diagnostics, education and personalized learning, software development and code assistance, content creation, autonomous system (such as autonomous driving, etc.), and/or the like.

For example, when the task query includes a query to identify an information technology (IT) anomaly relating to a usage of an IT component such as a network gateway, a router, an online printer, and/or the like, by performing method 600 at an environment of a local area network (LAN), the neural network based artificial agent may receive an observation from the environment at which the next-step action is executed, and determine that the observation representing an information technology anomaly (e.g., a router failure, an unauthorized access attempt, a domain name system anomaly, and/or the like). In some implementations, the neural network based artificial agent may cause an alert relating to the information technology anomaly to be displayed at a visualized user interface. In this way, IT anomalies may be detected and alerted using the neural network based artificial agent in an efficient manner so as to improve network support technology.

Example Results

FIGS. 7A-7E represent exemplary test results using embodiments described herein.

The BRIGHT benchmark (Hongjin Su, Howard Yen, Mengzhou Xia, Weijia Shi, Niklas Muennighoff, Han-yu Wang, Haisu Liu, Quan Shi, Zachary S Siegel, Michael Tang, et al. 2024. Bright: A realistic and challenging benchmark for reasoning-intensive retrieval. arXiv preprint arXiv:

2407.12883) is used to assess the performance of the proposed framework 200. BRIGHT is specifically designed to evaluate text retrieval systems on complex, reasoning-intensive queries that go beyond simple keyword matching. The benchmark comprises 1,398 real-world queries spanning diverse domains, including economics, psychology, robotics, math, and software engineering. These queries are carefully curated to represent challenging scenarios that require deep understanding and reasoning to identify relevant documents. This dataset is used to evaluate our approach because unlike traditional benchmarks that focus on simple information-seeking tasks, BRIGHT queries require complex reasoning to determine document relevance, making it an excellent tool for evaluating advanced retrieval systems in realistic scenarios. The benchmark has also been validated to be robust against potential data leakage, maintaining its effectiveness even when benchmark documents have been included in model training data.

Because of its challenging nature, state-of-the-art retrieval models have shown significantly lower performance on BRIGHT compared to other benchmarks (Hongjin Su, Howard Yen, Mengzhou Xia, Weijia Shi, Niklas Muennighoff, Han-yu Wang, Haisu Liu, Quan Shi, Zachary S Siegel, Michael Tang, et al. 2024. Bright: A realistic and challenging benchmark for reasoning-intensive retrieval. arXiv preprint arXiv:2407.12883). For example, the leading model on the MTEB leaderboard (Niklas Muennighoff, Nouamane Tazi, Loic Magne, and Nils Reimers. 2022. Mteb: Massive text embedding benchmark. arXiv preprint arXiv:2210.07316) achieves an nDCG@10 of only 18.0 on BRIGHT, compared to 59.0 on other benchmarks. The framework 200 with GPT-4 listwise also only improves around 2 points on nDCG@10 on top of the BM25 first-stage retrieval, while Gemini (Gemini Team, Rohan Anil, Sebastian Borgeaud, Yonghui Wu, Jean-Baptiste Alayrac, Jiahui Yu, Radu Soricut, Johan Schalkwyk, Andrew M Dai, Anja Hauth, et al. 2023. Gemini: a family of highly capable multimodal models. arXiv preprint arXiv:2312.11805) features less improvement than that. The cross-encoder framework 200 with MiniLM (Wenhui Wang, Furu Wei, Li Dong, Hangbo Bao, Nan Yang, and Ming Zhou. 2020. Minilm: Deep self-attention distillation for task-agnostic compression of pretrained transformers. *Advances in Neural In-formation Processing Systems,* 33:5776-5788) even significantly underperforms the BM25 baseline.

To test the generalizability of our approach, the BEIR benchmark is also evaluated on (Nandan Thakur, Nils Reimers, Andreas Rickl6, Ab-hishek Srivastava, and Iryna Gurevych. 2021. Beir: A heterogeneous benchmark for zero-shot evaluation of information retrieval models. In *Proceedings of the Neural Information Processing Systems Track on Datasets and Benchmarks*, volume 1), a robust and heterogeneous evaluation benchmark for information retrieval. All tasks in this benchmark that are publicly available (Kamalloo et al., 2023) are evaluated on. For all datasets the test set is used, except for MSMARCO where we follow BEIR convention to evaluate on the dev set. For cqadupstack BEIR convention is followed and evaluated on all sub-datasets and compute their average. Because BEIR is a large benchmark, and the largest dataset has more than 13K queries, only query analysis is generated to evaluate on this dataset. This almost adds no overhead to the generation because the query analysis generation does not depend on the document. Since the disclosed framework 100 (or LLM 206) only generates a single token "Yes" or "No", its latency is almost the same as encoding both the query and the document with an encoding-based retrieval model, making it a highly efficient alternative.

For both benchmarks evaluated on, common settings from previous work are followed to rerank the top-100 documents from the first-stage retrieval and use nDCG@10 score as the evaluation metric. This metric assesses the quality of the retrieved documents, taking into account both their relevance and ranking position.

The original BRIGHT paper explores using LLMs to generate Chain-of-Thought (Jason Wei, Xuezhi Wang, Dale Schuurmans, Maarten Bosma, brian ichter, Fei Xia, Ed H. Chi, Quoc V Le, and Denny Zhou. 2022. Chain of thought prompting elicits reasoning in large language models. In *Advances in Neural Information Processing Systems*) reasoning steps as queries (Hongjin Su, Howard Yen, Mengzhou Xia, Weijia Shi, Niklas Muennighoff, Han-yu Wang, Haisu Liu, Quan Shi, Zachary S Siegel, Michael Tang, et al. 2024. Bright: A realistic and challenging benchmark for reasoning-intensive retrieval. arXiv preprint arXiv: 2407.12883), resulting in up to 12.2 point improvements on average. This best first-retrieval model is built on the leaderboard, which achieves an nDCG@10 score of 26.5 with BM25 and reasoning chains generated by GPT-4-0125-preview.

The original BEIR paper (Nandan Thakur, Nils Reimers, Andreas Rücklé, Ab-hishek Srivastava, and Iryna Gurevych. 2021. Beir: A heterogeneous benchmark for zero-shot evaluation of information retrieval models. In *Proceedings of the Neural Information Processing Systems Track on Datasets and Benchmarks*, volume 1) is followed and ElasticSearch BM25 (BV Elasticsearch. 2018. Elasticsearch. software], version, 6(1).) is used as the first-stage retriever.

The main model (e.g., LLM 206) builds on top of Llama-3.1-70B-instruct (Abhimanyu Dubey, Abhinav Jauhri, Abhinav Pandey, Abhishek Kadian, Ahmad Al-Dahle, Aiesha Letman, Akhil Mathur, Alan Schelten, Amy Yang, Angela Fan, et al. 2024. The llama 3 herd of models. arXiv preprint arXiv:2407.21783). The Llama-3.1 model family is chosen because its ROPE scaling (Xiaoran Liu, Hang Yan, Chenxin An, Xipeng Qiu, and Dahua Lin. 2024b. Scaling laws of roPE-based extrapolation. In *The Twelfth International Conference on Learning Representations*) allows longer context length up to 128K, which is essential in handling long documents. To speed up experiments, a quantized version of this model, namely Llama-3.1-70B-instruct-awq-int4 is evaluated. Ablation studies were performed where Llama-3.1-8B and Llama-3.1-405B-instruct-awq-int4 are evaluated on. Note that for the 8B model the quantized version is not used because it can already fit on a single A100 GPU, while the other two bigger models require quantization to save computational cost. More specifically, the 70B version requires at least 2×A100 GPUs, while the 405B version requires 8.

RANKLLAMA (Xueguang Ma, Liang Wang, Nan Yang, Furu Wei, and Jimmy Lin. 2024. Fine-tuning llama for multi-stage text retrieval. In *Proceedings of the 47th International ACM SIGIR Conference on Research and Development in Information Retrieval*, SIGIR '24, page 2421-2425, New York, NY, USA. Association for Computing Machinery) and RANKZEPHYR (Ronak Pradeep, Sahel Sharifymoghaddam, and Jimmy Lin. 2023. RankZephyr: Effective and robust zero-shot listwise reranking is a breeze!arXiv:2312.02724) are reproduced, two state-of-the-art rerankers as evaluated by the BEIR benchmark. RankLlama is a pointwise reranker that directly outputs a score. This model is trained on the MS MARCO passage ranking dataset (Payal Bajaj, Daniel Campos, Nick Craswell, Li Deng, Jianfeng Gao, Xiaodong Liu, Rangan Majumder, Andrew McNamara, Bhaskar Mitra, Tri Nguyen, et al. 2016. Ms marco: A human generated ma-chine reading comprehension dataset. arXiv preprint arXiv:1611.09268). RANKZEPHYR is a listwise reranker that takes a query and a list of documents together as input and outputs a ranking. This model uses the queries sourced by Sun et al. (Weiwei Sun, Lingyong Yan, Xinyu Ma, Shuaiqiang Wang, Pengjie Ren, Zhumin Chen, Dawei Yin, and Zhaochun Ren. 2023. Is ChatGPT good at search? investigating large language models as re-ranking agents. In *Proceedings of the 2023 Conference on Empirical Methods in Natural Language Processing*, pages 14918-14937, Singapore. Association for Computational Linguistics) from the MS MARCO dataset to distill GPT-3.5 and GPT-4 in sequence. The RERANKERS library (Benjamin Clavie. 2024. rerankers: A lightweight python library to unify ranking methods. Preprint, arXiv: 2408.17344), a lightweight unified API that allows users to run diverse reranking models out-of-the-box, is used.

To make the encoding and generation more efficient, vLLM (Woosuk Kwon, Zhuohan Li, Siyuan Zhuang, Ying Sheng, Lianmin Zheng, Cody Hao Yu, Joseph Gonzalez, Hao Zhang, and Ion Stoica. 2023. Efficient memory management for large language model serving with pagedattention. In *Proceedings of the 29th Symposium on Operating Systems Principles*, pages 611-626) is used. This library leverages paged attention, which improves the throughput of popular LLMs by 2-4× with the same level of latency. Importantly, when designing the prompts used in our approach, the query and the document are appended at the very end of each prompt to make the best use of Automatic Prefix Caching (In Gim, Guojun Chen, Seung-seob Lee, Nikhil Sarda, Anurag Khandelwal, and Lin Zhong. 2024. Prompt cache: Modular attention reuse for low-latency inference. *Proceedings of Machine Learning and Systems*, 6:325-338), which temporarily stores the KV cache of existing inputs so that a new input can directly reuse the KV cache if it shares the same prefix with one of the existing ones. This allows the new inputs to skip the computation of the shared part. This design greatly improves the efficiency of the experiments.

As shown in FIG. 7A, JUDGERANK (e.g., framework 200) achieves state-of-the-art results on the BRIGHT evaluation benchmark as measured by nDCG@10. The best preforming model improves upon the no-rerank baseline by more than 9 points, while RANKLLAMA underperforms the baseline and RANKZEPHYR stays barely above the baseline. The smaller Llama-3.1-8B-instruct also outperforms the baseline by more than 3 points, showing the generalizability of our approach across different model sizes. Interestingly, increasing model size from 70B to 405B does not bring a significant gain on nDCG@10. The 70B version is selected as the main model to balance between efficiency and performance. In contrast, the original BRIGHT paper shows that GPT-4 with listwise reranking improves on top of vanilla BM25 baseline by an average of 2.7 points on nDCG@10, a much smaller improvement than the disclosed approach despite using a much stronger LLM.

As shown in FIG. 7B, JudgeRank (e.g., framework 200) delivers competitive results on the BEIR evaluation benchmark despite the fact that RANKLLAMA and RANKZEPHYR are heavily fine-tuned on in-domain data including MS MARCO, which is part of the BEIR benchmark.

Figure 7C:
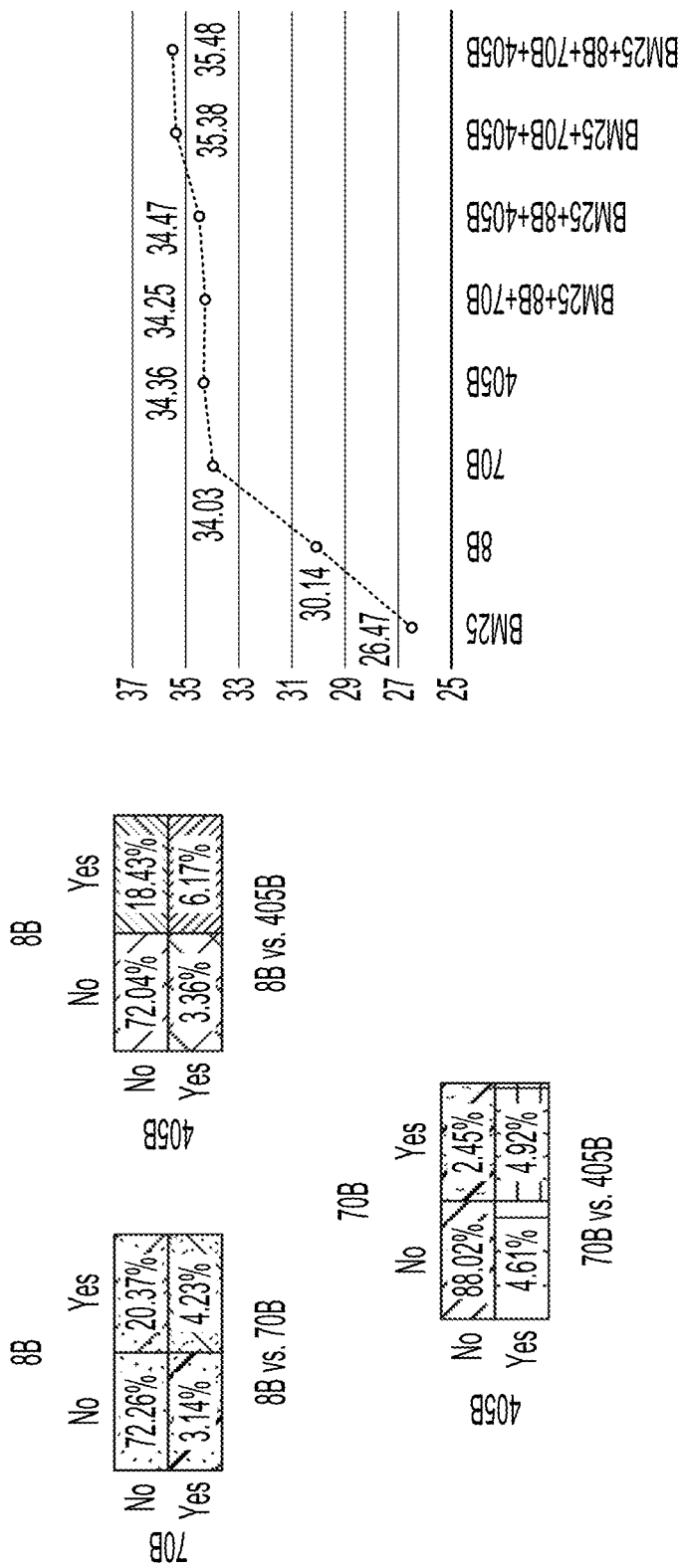

How complementary are LLMs of different scales? In FIG. 7A, it is observed that JudgeRank-70B and JudgeRank-405B performs on par with each other. However, nDCG@10 alone does not reveal the whole picture. One natural question to ask is: do these two models make similar judgments or are complementary to each other? To answer this question, statistics on the percentage of both models agreeing and disagreeing each other are obtained, and they are shown on the left of FIG. 7C. From the tables it can be seen that for all three combinations of the models, the majority case is always that both models rejects the documents. This is understandable because only a few out of the top-100 documents are supposed to be relevant. The interesting pattern emerges when the other three cases are inspected: each pair of the models spends more time disagreeing with each other than both outputting "Yes". For the pairs 8B vs 70B and 8B vs 405B, there is a higher difference because the capabilities of the two models differ more. In contrast, for 70B vs 405B there is less disagreement. From these observations, it is seen that each two models may be complementary to each other.

Motivated by this observation, model ensembling is taken one step further. The BM25 score is ensembled with each of the scores output by the Llama models. Here the average score output by all the Llama models is first taken, and then the weighted sum with the BM25 score is performed. More specifically, let $S_{8B}$, $S_{70B}$, and $S_{405B}$ be the score assigned by each model, respectively, the ensemble score of the three models is computed as $$\frac{\alpha(S_{8B} + S_{60B} + S_{405B})}{3} + S_{BM25},$$

where again $\alpha=100$ and $S_{BM25}$ is the score given by the BM25 model. The same equation generalizes analogously to two-model ensembles.

All ensembling results are presented on the right of FIG. 7C. It can be seen that each ensembling performance is better than its individual model performances, with the strongest performance observed when ensembling all three models. This result shows that a salient performance boost can be achieved by ensembling two of the strongest models (70B+405B), while even the model with lower performance (e.g., 8B) could contribute positively in model ensembling. Intuitively, such ensembling is equivalent to a verification or a majority voting step. The final score is the highest when both models say "Yes", the score is medium when one of the two says "No", and the lowest score is observed when both say "No".

Figure 7D:
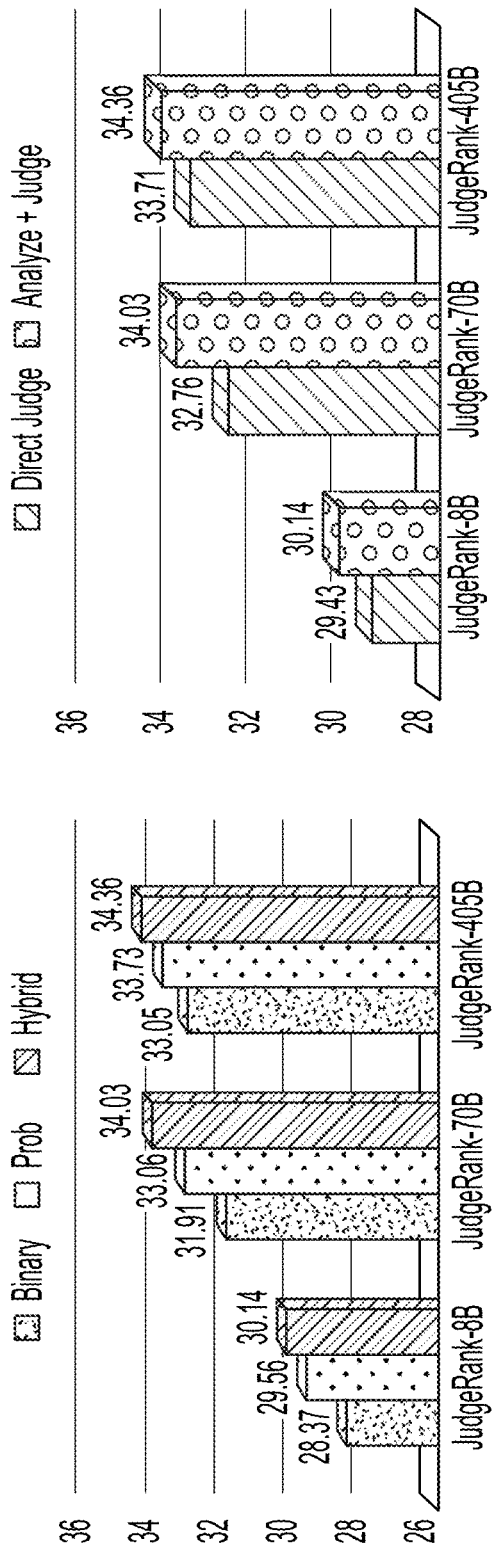

How does the choice of reranking score impact the final performance? Recall that to compute the final score, a weighted sum of the BM25 score and the probability score from the judgment step is taken. To justify this choice, it is compared with two other settings: the first is binary judgment, and the second only uses the normalized probability to rerank documents (introduced in Section 3). The left part of FIG. 7D shows that binary judgment performs the worst among the three settings while using only probability achieves somewhere in between. This is understandable because binary judgments are sensitive to wordings. Imagine that if the relation is changed from "substantially helps answer" to "helps answer" or "at least partially helps answer," the number of "Yes" that the model outputs will keep increasing, thus also increasing the number of false positives. However, the other two settings are not sensitive to such changes.

How useful are the query and document analysis steps? To show the effectiveness of the analysis steps, an ablation study is performed on BRIGHT. The two analyses steps are removed and the judgment step is kept untouched to compare its performance with the original approach. The right of FIG. 7D shows that judging with query and document analyses performs consistently better than the direct judgment approach.

FIG. 7E demonstrates how JudgeRank (e.g., framework 200) enhances document relevance identification using real examples from the BRIGHT dataset. In the left example, it is observed that a document initially ranked high by the first-stage retriever due to significant word overlap with the query. However, JudgeRank's deeper analysis correctly judges this document as irrelevant. Despite surface-level similarities, the reranker fails to extract any sentences that help answer the query, revealing that the document is merely an advertisement coincidentally sharing common terminology with the query. The right example presents a contrasting scenario, where a document initially ranked low by the first-stage retriever due to minimal word overlap with the query is accurately identified by JudgeRank as highly relevant. In this instance, the document analysis prompt enables the LLM to pinpoint key sentences that elucidate the underlying mechanism of funnel web spider venom's lethality, precisely addressing the query's intent. These extracted sentences further inform the LLM (e.g., 206) to make the final positive judgment, demonstrating JudgeRank's ability to uncover deeply relevant content that might be overlooked by traditional retrieval methods.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method for building an artificial intelligence (AI) agent to respond to a user query, the method comprising:
   receiving, via a data interface, a user query in natural language;
   retrieving, by one or more neural network based language models, a set of documents that are ranked based on respective relevance scores of a first type to the user query;
   generating, by the one or more neural network based language models, a core question that filters out irrelevant texts from the user query;
   generating, by the one or more neural network based language models, a first summary of a first document from the set of documents and a first reasoning output explaining how the first summary addresses the core question based on a summarization input prompt that instructs the one or more neural network based language models to summarize the first document guided by the core question;
   generating, by the one or more neural network based language models, a relevance score of a second type and a corresponding reranking for the first document based at least in part on a combination of the core question and the first reasoning output;
   generating, by the one or more neural network based language models, a response to the user query using one or more top-ranked documents according to generated rerankings of the set of documents; and
   causing the response to be displayed at a visualized user interface of the AI agent.

2. The method of claim 1, wherein the relevance scores of the first type includes BM25 relevance scores.

3. The method of claim 1, wherein the generating, by the one or more neural network based language models, the relevance score of a second type includes:
   generating a binary partition that separates one or more accepted documents and one or more rejected documents in the set of documents;
   maintaining the one or more accepted documents and the one or more rejected documents based on an order of the relevance scores of the first type; and
   determining the relevance score of the second type to be associated with the order.

4. The method of claim 1, wherein the generating, by the one or more neural network based language models, the relevance score of a second type includes:
   generating a first probability distribution of being accepted for a document of the set of documents and a second probability distribution of being rejected for the document; and
   generating the relevance score of the second type based on a normalization of the first probability distribution and the second probability distribution for the document.

5. The method of claim 1, wherein the generating, by the one or more neural network based language models, the relevance score of a second type includes:
   generating a first probability distribution of being accepted for a document of the set of documents and a second probability distribution of being rejected for the document;
   generating a first ranking score based on a normalization of the first probability distribution and the second probability distribution for the document; and generating the relevance score of the second type to be a weighted sum of the first ranking score and the relevance score of the first type.

6. The method of claim 1, wherein the generating, by the one or more neural network based language models, the first summary of a first document from the set of documents includes:
extracting one or more sentences from a respective document in the set of documents based on the summarization input prompt that instructs the one or more neural network based language models to extract the one or more sentences from the first document guided by the core question.

7. The method of claim 1, wherein:
the core question of the user query is generated by a first neural network based language model; and
the first summary or the relevance score of the second type is generated by a second neural network based language model, wherein the first neural network based language model is larger than the second neural network based language model.

8. The method of claim 1, further comprising building, at a server, the AI agent through one or more application programming interfaces (APIs) to the one or more neural network based language models.

9. A system for building an artificial intelligence (AI) agent to respond to a user query, the system comprising:
a memory that stores a one or more neural network based language models and a plurality of processor executable instructions;
a communication interface that receives a user query in natural language; and
one or more hardware processors that read and execute the plurality of processor-executable instructions from the memory to perform operations comprising:
retrieving, by the one or more neural network based language models, a set of documents that are ranked based on respective relevance scores of a first type to the user query;
generating, by the one or more neural network based language models, a core question that filters out irrelevant texts from the user query;
generating, by the one or more neural network based language models, a first summary of a first document from the set of documents and a first reasoning output explaining how the first summary addresses the core question based on a summarization input prompt that instructs the one or more neural network based language models to summarize the first document guided by the core question;
generating, by the one or more neural network based language models, a relevance score of a second type and a corresponding reranking for the first document based at least in part on a combination of the core question and the first reasoning output;
generating, by the one or more neural network based language models, a response to the user query using one or more top-ranked documents according to generated rerankings of the set of documents; and
causing the response to be displayed at a visualized user interface of the AI agent.

10. The system of claim 9, wherein the relevance scores of the first type includes BM25 relevance scores.

11. The system of claim 9, wherein the generating, by the one or more neural network based language models, the relevance score of a second type includes:
generating a binary partition that separates one or more accepted documents and one or more rejected documents in the set of documents;
maintaining the one or more accepted documents and the one or more rejected documents based on an order of the relevance scores of the first type; and
determining the relevance score of the second type to be associated with the order.

12. The system of claim 9, wherein the generating, by the one or more neural network based language models, the relevance score of a second type includes:
generating a first probability distribution of being accepted for a document of the set of documents and a second probability distribution of being rejected for the document; and
generating the relevance score of the second type based on a normalization of the first probability distribution and the second probability distribution for the document.

13. The system of claim 9, wherein the generating, by the one or more neural network based language models, the relevance score of a second type includes:
generating a first probability distribution of being accepted for a document of the set of documents and a second probability distribution of being rejected for the document;
generating a first ranking score based on a normalization of the first probability distribution and the second probability distribution for the document; and
generating the relevance score of the second type to be a weighted sum of the first ranking score and the relevance score of the first type.

14. The system of claim 9, wherein generating, by the one or more neural network based language models, the first summary of a first document from the set of documents includes:
extracting one or more sentences from a respective document in the set of documents based on the summarization input prompt that instructs the one or more neural network based language models to extract the one or more sentences from the first document guided by the core question.

15. The system of claim 9, wherein:
the core question of the user query is generated by a first neural network based language model; and
the first summary or the relevance score of the second type is generated by a second neural network based language model, wherein the first neural network based language model is larger than the second neural network based language model.

16. The system of claim 9, further comprising building, at a server, the AI agent through one or more application programming interfaces (APIs) to the one or more neural network based language models.

17. A non-transitory machine-readable medium comprising a plurality of machine-executable instructions which, when executed by one or more processors, are adapted to cause the one or more processors to perform operations comprising:
receiving, via a data interface, a user query in natural language;
retrieving, by one or more neural network based language models, a set of documents that are ranked based on respective relevance scores of a first type to the user query;

generating, by one or more neural network based language models, a core question that filters out irrelevant texts from the user query;

generating, by the one or more neural network based language models, a first summary of a first document from the set of documents and a first reasoning output explaining how the first summary addresses the core question based on a summarization input prompt that instructs the one or more neural network based language models to summarize the first document guided by the core question;

generating, by the one or more neural network based language models, a relevance score of a second type and a corresponding reranking for the first document based at least in part on a combination of the core question and the first reasoning output;

generating, by the one or more neural network based language models, a response to the user query using one or more top-ranked documents according to generated rerankings of the set of documents; and causing the response to be displayed at a visualized user interface of the AI agent.

18. The non-transitory machine-readable medium of claim 17, wherein the relevance scores of the first type includes BM25 relevance scores.

19. The non-transitory machine-readable medium of claim 17, wherein the generating, by the one or more neural network based language models, the relevance score of a second type includes:

generating a binary partition that separates one or more accepted documents and one or more rejected documents in the set of documents;

maintaining the one or more accepted documents and the one or more rejected documents based on an order of the relevance scores of the first type; and determining the relevance score of the second type to be associated with the order.

20. The non-transitory machine-readable medium of claim 17, wherein the generating, by the one or more neural network based language models, the relevance score of a second type includes:

generating a first probability distribution of being accepted for a document of the set of documents and a second probability distribution of being rejected for the document; and generating the relevance score of the second type based on a normalization of the first probability distribution and the second probability distribution for the document.

* * * * *